United States Patent
Sun et al.

(10) Patent No.: US 10,007,472 B2
(45) Date of Patent: Jun. 26, 2018

(54) PRINTING SYSTEM, AND RECORDING MEDIUM THEREFOR, THAT ENABLE SPOOLING OF INSTRUCTION EXECUTION TYPE PRINT JOBS IN PRINT APPARATUS IN ACCORDANCE WITH PRINT-REGULATING INFORMATION

(71) Applicant: Kyocera Document Solutions Inc., Osaka (JP)

(72) Inventors: Zhenyu Sun, Osaka (JP); Masafumi Sato, Osaka (JP); Tatsuya Hiwatari, Osaka (JP); Yoshio Inoue, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 0 days. days.

(21) Appl. No.: 15/469,523

(22) Filed: Mar. 25, 2017

(65) Prior Publication Data

US 2017/0277490 A1    Sep. 28, 2017

(30) Foreign Application Priority Data

Mar. 25, 2016 (JP) ................. 2016-061302

(51) Int. Cl.
```
G06F 3/12      (2006.01)
H04N 1/00      (2006.01)
H04N 1/44      (2006.01)
```
(52) U.S. Cl.
CPC .......... *G06F 3/1238* (2013.01); *G06F 3/126* (2013.01); *G06F 3/1222* (2013.01); *G06F 3/1288* (2013.01); *H04N 1/00204* (2013.01); *H04N 1/00344* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| 2012/0293819 A1* | 11/2012 | Doui | H04L 63/083 |
| | | | 358/1.13 |
| 2015/0178026 A1* | 6/2015 | Sato | G06F 3/1238 |
| | | | 358/1.14 |

FOREIGN PATENT DOCUMENTS

| JP | 2012-115992 A | | 6/2012 |
| JP | 2012115992 A | * | 6/2012 |

* cited by examiner

*Primary Examiner* — Andrew H Lam
(74) *Attorney, Agent, or Firm* — James Judge

(57) ABSTRACT

A printing system includes a server, an electronic device and a print apparatus. The electronic device includes a central processing unit (CPU) and a storage device storing a printer driver. The CPU executes the printer driver to function as an authentication unit, a user information storage unit, and a job transmitter. The authentication unit transmits authentication information of a user and receives user information from the server. The user information storage unit stores the user information received by the authentication unit. The job transmitter uses the user information received by the authentication unit to transmit an instruction execution type print job to the print apparatus. If the user information is not received by the authentication unit, the job transmitter transmits the instruction execution type print job corresponding to print regulation information included in the user information stored in the user information storage unit to the print apparatus.

8 Claims, 12 Drawing Sheets

PRINTING SYSTEM, AND RECORDING MEDIUM THEREFOR, THAT ENABLE SPOOLING OF INSTRUCTION EXECUTION TYPE PRINT JOBS IN PRINT APPARATUS IN ACCORDANCE WITH PRINT-REGULATING INFORMATION

INCORPORATION BY REFERENCE

This application is based upon, and claims the benefit of priority from, corresponding Japanese Patent Application No. 2016-061302 filed in the Japan Patent Office on Mar. 25, 2016, the entire contents of which are incorporated herein by reference.

BACKGROUND

Unless otherwise indicated herein, the description in this section is not prior art to the claims in this application and is not admitted to be prior art by inclusion in this section.

There is known a typical printing system including: a server for authenticating a user; an electronic device that generates a print job; and a print apparatus that executes the print job. Here, when the print apparatus receives authentication information of a user from the electronic device, the print apparatus transmits the received authentication information to the server. Then, when the server receives the authentication information for authenticating the user from the print apparatus and succeeds in a user authentication based on the received authentication information, the server returns authentication success information indicating the successful authentication to the print apparatus. Next, when the print apparatus receives the authentication success information from the server, the print apparatus stores the authentication information of the user and executes the print job. Then, when the print apparatus receives authentication information of a user from the electronic device, the print apparatus itself executes an authentication using the stored authentication information in the case of being incommunicable with the server.

SUMMARY

A printing system according to one aspect of the disclosure includes a server, an electronic device, and a print apparatus. The server authenticates users. The electronic device generates print jobs. The print apparatus executes the print jobs. When the server receives authentication information for authenticating a user, and authentication of the user based on the received authentication information has succeeded, the server returns user information relating to the user whose authentication has succeeded to the electronic device. The user information includes print regulation information for regulating at least one of printing kind and printing amount. The print apparatus spools an instruction execution type print job as the print job to be executed in response to a specific instruction. The electronic device includes a central processing unit (CPU) and a storage device storing a printer driver. The CPU executes the printer driver to function as an authentication unit, a user information storage unit, and a job transmitter. The authentication unit transmits to the server the authentication information of a user and receives the user information from the server. The user information storage unit stores the user information received by the authentication unit. The job transmitter uses the user information received by the authentication unit to transmit the instruction execution type print job to the print apparatus. If the user information is not received by the authentication unit, the job transmitter transmits the instruction execution type print job corresponding to the print regulation information included in the user information stored in the user information storage unit to the print apparatus.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
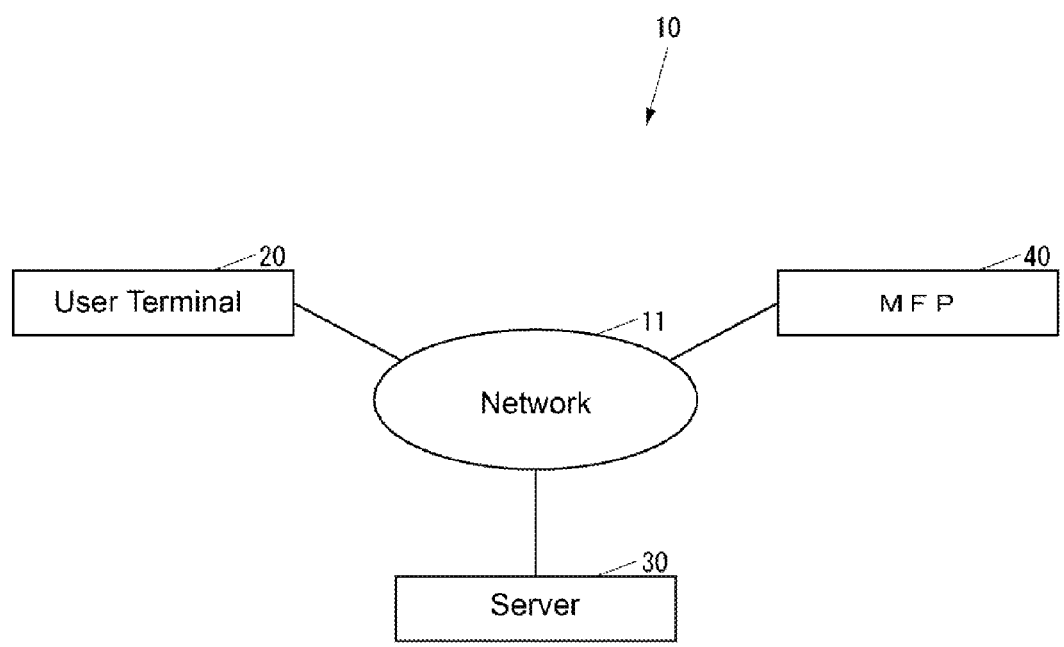
FIG. 1 illustrates a block diagram of a printing system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, may be arranged, substituted, combined, separated, and designed in a wide variety of different configurations, all of which are explicitly contemplated herein.

The following describes one embodiment of the disclosure with reference to the drawings.

First, the following describes a configuration of a printing system according to the embodiment.

FIG. 1 illustrates a block diagram of a printing system 10 according to the embodiment.

As illustrated in FIG. 1, the printing system 10 includes a user terminal 20 as an electronic device that generates print data, a server 30, and a multifunction peripheral (MFP) 40 as a print apparatus that executes a print job. The user terminal 20, the server 30, and the MFP 40 are communicable with one another via a network 11 such as a local area network (LAN) or the Internet.

The printing system 10 may include at least one user terminal similar to the user terminal 20 in addition to the user terminal 20. Similarly, the printing system 10 may include at least one MFP similar to the MFP 40 in addition to the MFP 40.

Figure 2:
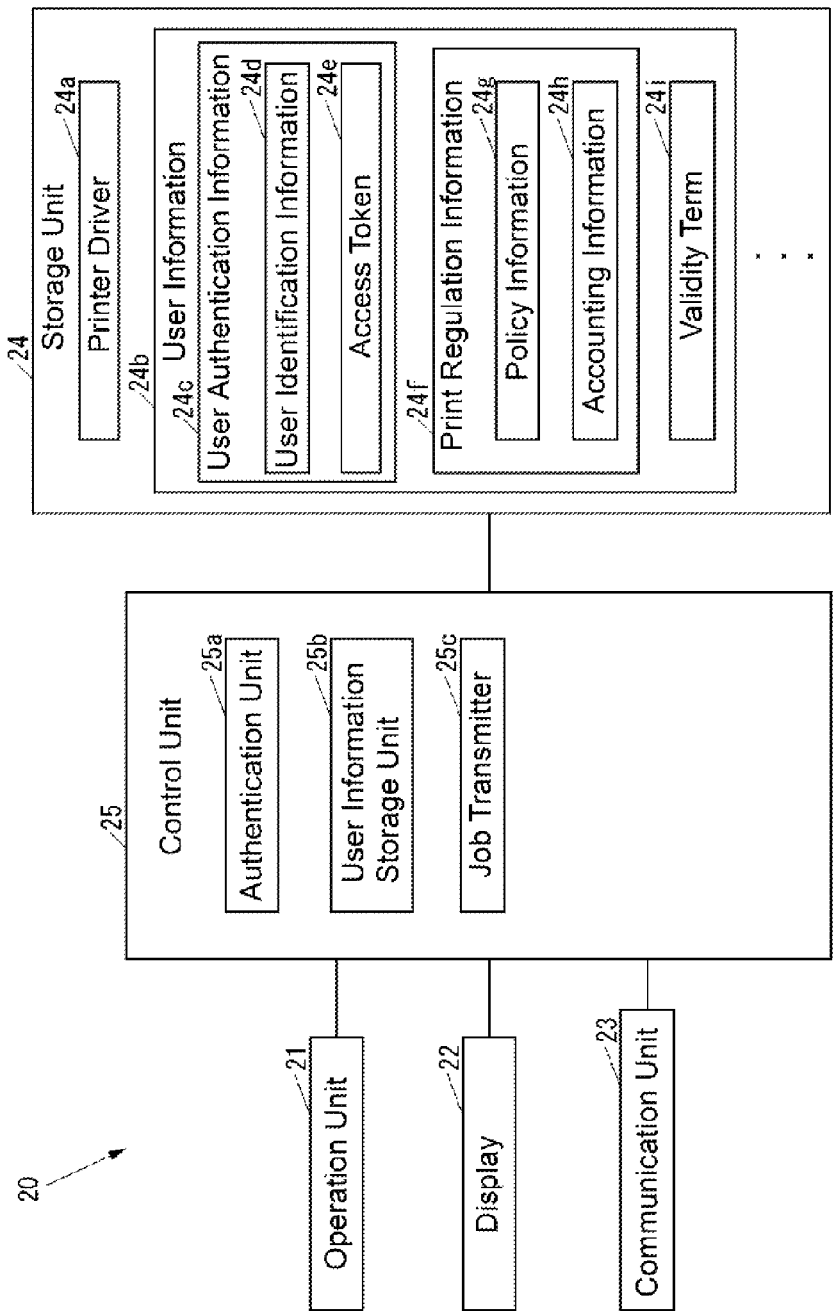
FIG. 2 illustrates a block diagram of a user terminal according to the one embodiment.

FIG. 2 illustrates a block diagram of the user terminal 20.

As illustrated in FIG. 2, the user terminal 20 includes an operation unit 21, a display 22, a communication unit 23, a storage unit 24, and a control unit 25. The operation unit 21 is an input device with which a user inputs various kinds of operations. The display 22 is a display device such as a liquid crystal display (LCD) that displays various kinds of information. The communication unit 23 is a communication device that communicates with an external device via the network 11 (see FIG. 1). The storage unit 24 is a non-volatile storage device such as a semiconductor memory or a hard disk drive (HDD) that stores various kinds of data. The control unit 25 controls the entire user terminal 20. The user terminal 20 includes a portable terminal such as a smart phone, or a computer such as a personal computer (PC).

The storage unit 24 stores a printer driver 24a as a job transmission program that generates print data to transmit it as a print job. The printer driver 24a may be installed in the user terminal 20 at production stage of the user terminal 20, may be additionally installed in the user terminal 20 from an external storage medium such as a universal serial bus (USB) memory, or may be additionally installed in the user terminal 20 from the network 11.

The storage unit 24 ensures storing user information 24b related to a user for each user.

The user information 24b includes user authentication information 24c related to a user authentication. The user authentication information 24c includes identification information 24d (hereinafter referred to as "user identification information") of the user and an access token 24e as authentication success information indicating a successful authentication by the server 30 (see FIG. 1).

The user information 24b includes print regulation information 24f for regulating printing. The print regulation information 24f includes policy information 24g and accounting information 24h. The policy information 24g is information for regulating printing kind. The accounting information 24h is information for regulating printing amount. The policy information 24g includes, for example, information indicating whether printing is executable or not; information indicating whether color printing is executable or not; and information indicating whether eco printing, which is more eco-friendly than ordinary printing, is forced or not. The accounting information 24h includes, for example, the number of sheets on which printing has been executed; the permitted number (hereinafter referred to as "the permitted number of sheets") of printing sheets; a processing item for printing with exceeding the permitted number of sheets; and a balance when the printing is permitted in accordance with a charge. The processing item for printing with exceeding the permitted number of sheets is, for example, "stop printing" and "stop color printing."

The user information 24b includes a validity term 24i of the user information 24b itself.

The control unit 25 includes, for example, a central processing unit (CPU), a read only memory (ROM), and a random access memory (RAM). The ROM stores programs and various kinds of data. The RAM is used as a work area of the CPU. The CPU executes the programs stored in the ROM or the storage unit 24.

The control unit 25 executes the printer driver 24a to function as an authentication unit 25a, a user information storage unit 25b, and a job transmitter 25c. The authentication unit 25a transmits authentication information of the user to the server 30 to receive user information from the server 30. The user information storage unit 25b stores the user information received by the authentication unit 25a. The job transmitter 25c uses the user information received by the authentication unit 25a to transmit an instruction execution type print job as a print job to be executed in response to a specific instruction to the server 30 or the MFP 40. Here, the authentication information is, for example, a combination of the user identification information and a password.

Figure 3:
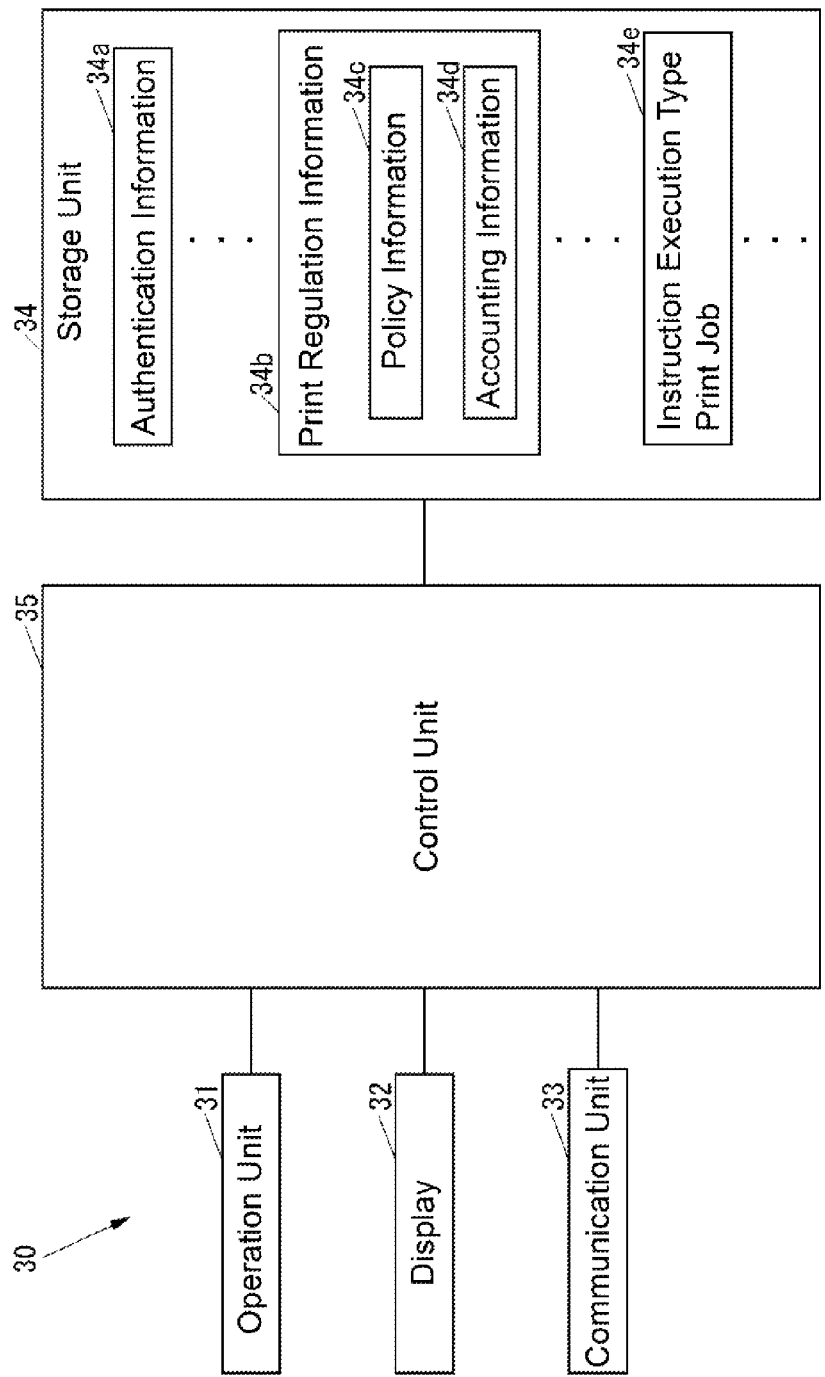
FIG. 3 illustrates a block diagram of a server according to the one embodiment.

FIG. 3 illustrates a block diagram of the server 30.

As illustrated in FIG. 3, the server 30 includes an operation unit 31, a display 32, a communication unit 33, a storage unit 34, and a control unit 35. The operation unit 31 is an input device such as a computer mouse or a keyboard with which the user inputs various kinds of operations. The display 32 is a display device such as an LCD that displays various kinds of information. The communication unit 33 is a communication device that communicates with an external device via the network 11 (see FIG. 1). The storage unit 34 is a non-volatile storage device such as a semiconductor memory or an HDD that stores various kinds of data. The control unit 35 controls the entire server 30. The server 30 is constituted of a computer such as a PC.

The storage unit 34 stores authentication information 34a, such as a combination of user identification information and a password of a user, for authenticating the user.

The storage unit 34 stores print regulation information 34b for each user. The print regulation information 34b is information for regulating printing. The print regulation information 34b includes policy information 34c and accounting information 34d. The policy information 34c is information for regulating printing kind. The accounting information 34d is information for regulating printing amount.

The storage unit 34 ensures storing a plurality of instruction execution type print jobs 34e. The storage unit 34 associates each of the instruction execution type print jobs 34e with any of user identification information to store the associated information.

The control unit 35 includes, for example, a CPU, a ROM, and a RAM. The ROM stores programs and various kinds of data. The RAM is used as a work area of the CPU. The CPU executes the programs stored in the ROM or the storage unit 34.

Figure 4:
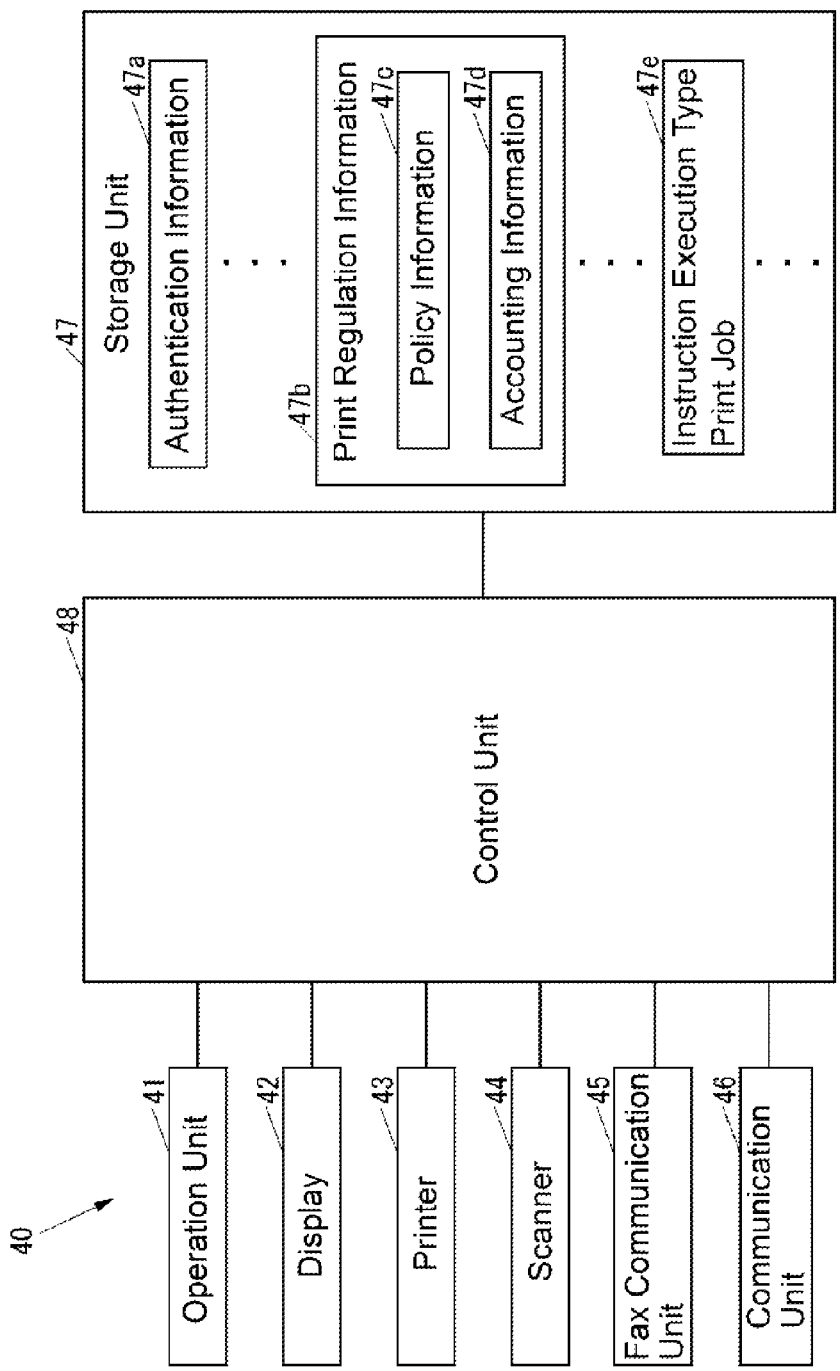
FIG. 4 illustrates a block diagram of an MFP according to the one embodiment.

FIG. 4 illustrates a block diagram of the MFP 40.

As illustrated in FIG. 4, the MFP 40 includes an operation unit 41, a display 42, a printer 43, a scanner 44, a fax communication unit 45, a communication unit 46, a storage unit 47, and a control unit 48. The operation unit 41 is an input device such as a button with which the user inputs various kinds of operations. The display 42 is a display device such as an LCD that displays various kinds of information. The printer 43 is a print device that prints on a recording medium such as a paper sheet. The scanner 44 is a reading device that reads image data from an original document. The fax communication unit 45 is a fax device that performs fax communication with an external facsimile device (not illustrated) via a communication line such as a dial-up line. The communication unit 46 is a network communication device that communicates with an external device via the network 11 (see FIG. 1). The storage unit 47 is a non-volatile storage device such as a semiconductor memory or an HDD that stores various kinds of data. The control unit 48 controls the entire MFP 40.

The storage unit 47 stores authentication information 47a, such as a combination of user identification information and a password of a user, for authenticating the user.

The storage unit 47 stores print regulation information 47b for each user. The print regulation information 47b is information for regulating printing. The print regulation information 47b includes policy information 47c and accounting information 47d. The policy information 47c is information for regulating printing kind. The accounting information 47d is information for regulating printing amount.

The storage unit 47 is enabled for storing a plurality of instruction-executed print jobs 47e. The storage unit 47 stores the instruction-executed print jobs 47e each correlated with any given of user identification information.

The control unit 48 includes, for example, a CPU, a ROM, and a RAM. The ROM stores programs and various kinds of data. The RAM is used as a work area of the CPU. The CPU executes the programs stored in the ROM or the storage unit 47.

The control unit 48 confirms the authentication information 34a and the print regulation information 34b of the server 30 at a specific timing so as to keep the authentication information 47a and the print regulation information 47b to be identical to the authentication information 34a and the print regulation information 34b of the server 30.

Next, the following describes operations of the printing system 10.

First, the following describes operations of the user terminal 20 when transmitting a print job.

Figure 5:
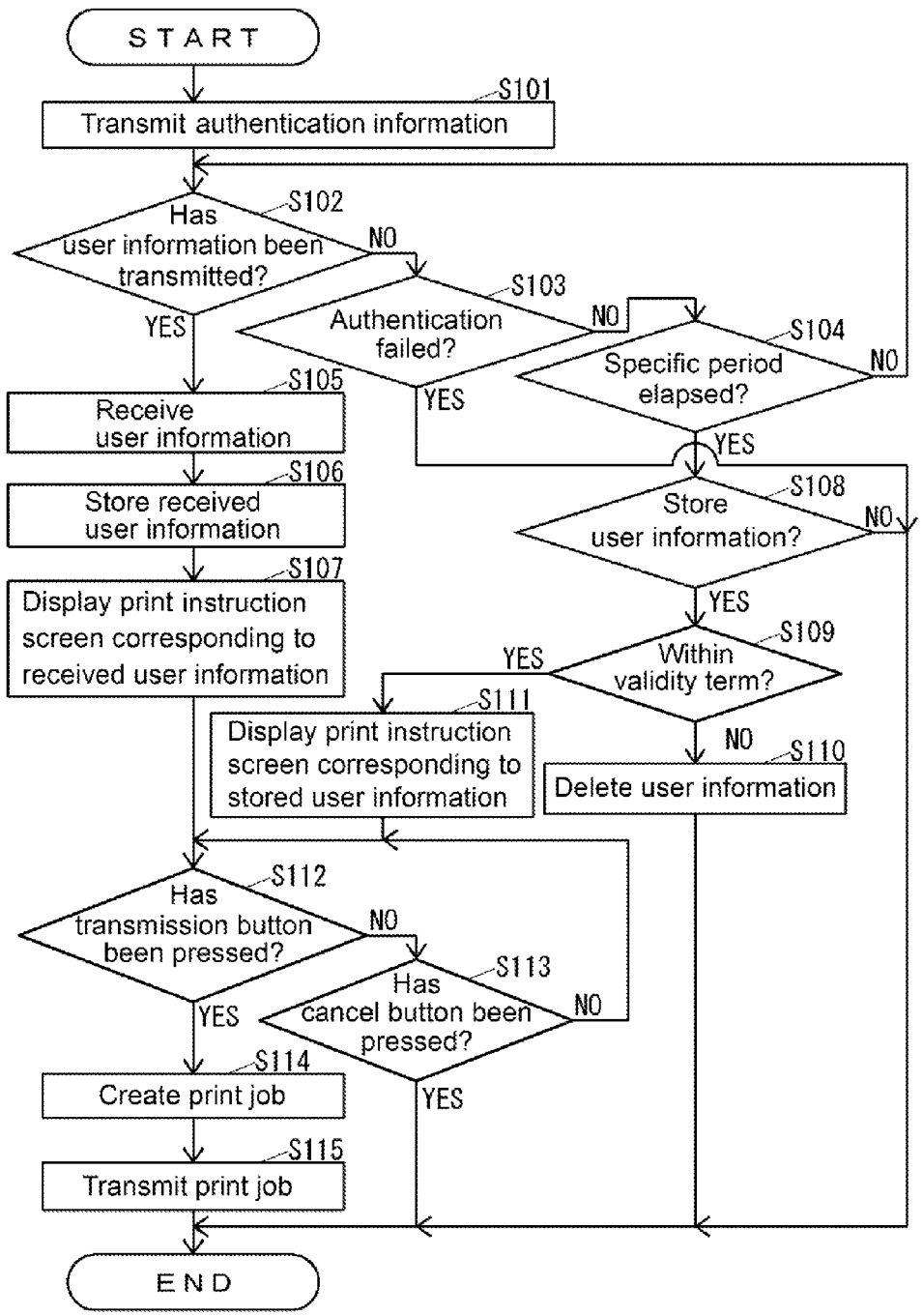
FIG. 5 illustrates operations of the user terminal according to the one embodiment when transmitting a print job.

FIG. 5 illustrates the operations of the user terminal 20 when transmitting the print job.

When an instruction displayed in a print instruction screen is received via the operation unit 21, the control unit 25 of the user terminal 20 executes the operations illustrated in FIG. 5.

As illustrated in FIG. 5, the authentication unit 25a of the control unit 25 transmits the authentication information received via the operation unit 21 to the server 30 (Step S101). Here, the authentication information may be input via the operation unit 21 before the operations illustrated in FIG. 5 or may be input at Step S101. Thus, when the storage unit 34 stores the authentication information 34a identical to the authentication information transmitted from the user terminal 20, the control unit 35 of the server 30 permits a login of a user and generates user information including print regulation information 34b of this user, so as to return this user information to the user terminal 20.

After the process of Step S101, the authentication unit 25a determines whether the server 30 has transmitted user information or not (Step S102).

When the authentication unit 25a determines that the user information is not transmitted from the server 30 at Step S102, the authentication unit 25a determines whether a failure of authentication has been notified from the server 30 or not (Step S103).

When the authentication unit 25a determines that the failure of the authentication has not been notified from the server 30 at Step S103, the authentication unit 25a terminates the operations illustrated in FIG. 5.

When the authentication unit 25a determines that the failure of the authentication has not been notified from the server 30 at Step S103, the authentication unit 25a determines whether a specific period has elapsed after the process of Step S101 or not (Step S104). When the server 30 is in an off-line state, for example, the server 30 is down, or when some sort of communication failure occurs between the user terminal 20 and the server 30, the specific period elapses after the process of Step S101.

When the authentication unit 25a determines that the specific period has not elapsed at Step S104, the authentication unit 25a executes the process of Step S102.

When the authentication unit 25a determines that the server 30 has transmitted the user information at Step S102, the authentication unit 25a receives the user information transmitted from the server 30 (Step S105).

Next, the user information storage unit 25b of the control unit 25 causes the storage unit 24 to store the user information received at Step S105 as the user information 24b (Step S106).

Then, the job transmitter 25c of the control unit 25 displays a print instruction screen 50 (see FIG. 6) corresponding to the user information received at Step S105 (Step S107).

Figure 6:
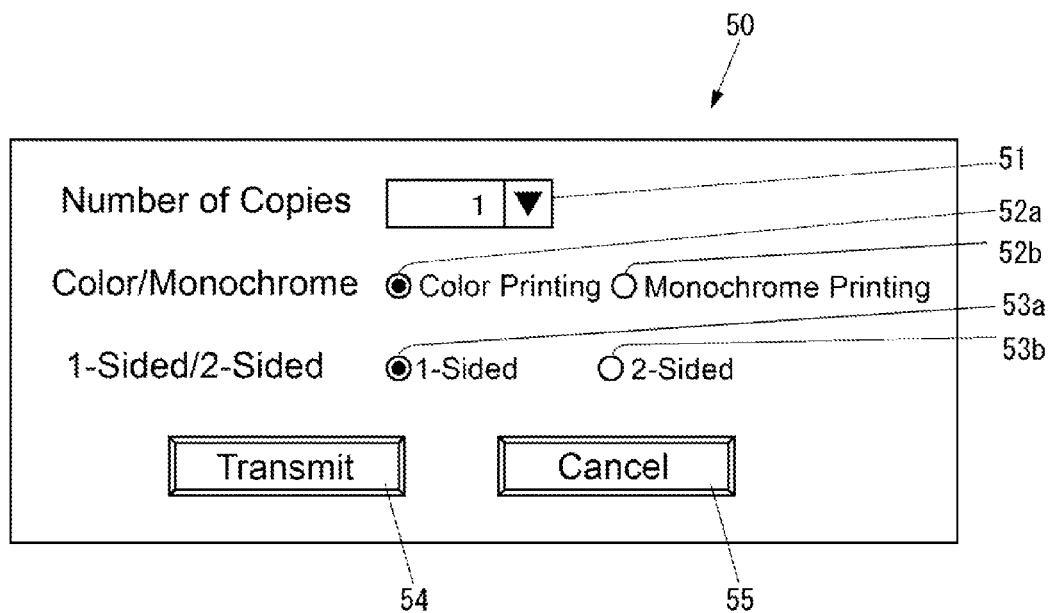
FIG. 6 illustrates an example of a print instruction screen displayed during the operations illustrated in FIG. 5.

The print instruction screen 50 illustrated in FIG. 6 includes a pull-down menu 51, radio buttons 52a and 52b, radio buttons 53a and 53b, a transmission button 54, and a cancel button 55. The pull-down menu 51 is a menu for specifying the number of copies to be printed. The radio buttons 52a and 52b are buttons for specifying any of color printing and monochrome printing. The radio buttons 53a and 53b are buttons for specifying any of single-side printing and duplex printing. The transmission button 54 is a button for executing a transmission of an instruction execution type print job. The cancel button 55 is a button for terminating the operations illustrated in FIG. 5.

Figure 7:
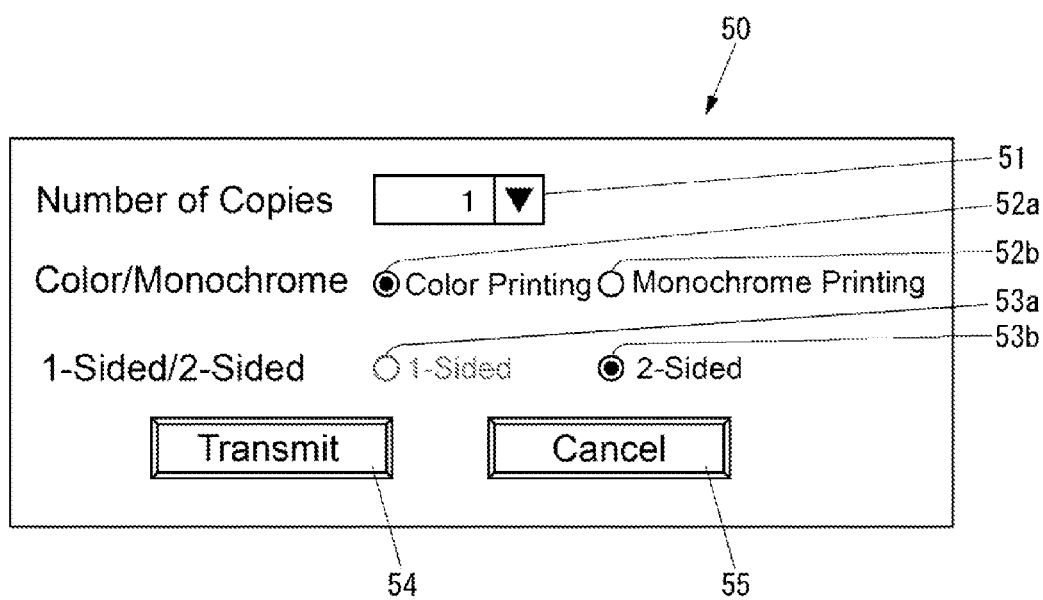
FIG. 7 illustrates an example of the print instruction screen displayed during the operations illustrated in FIG. 5, which is different from the example illustrated in FIG. 6.
Figure 8:
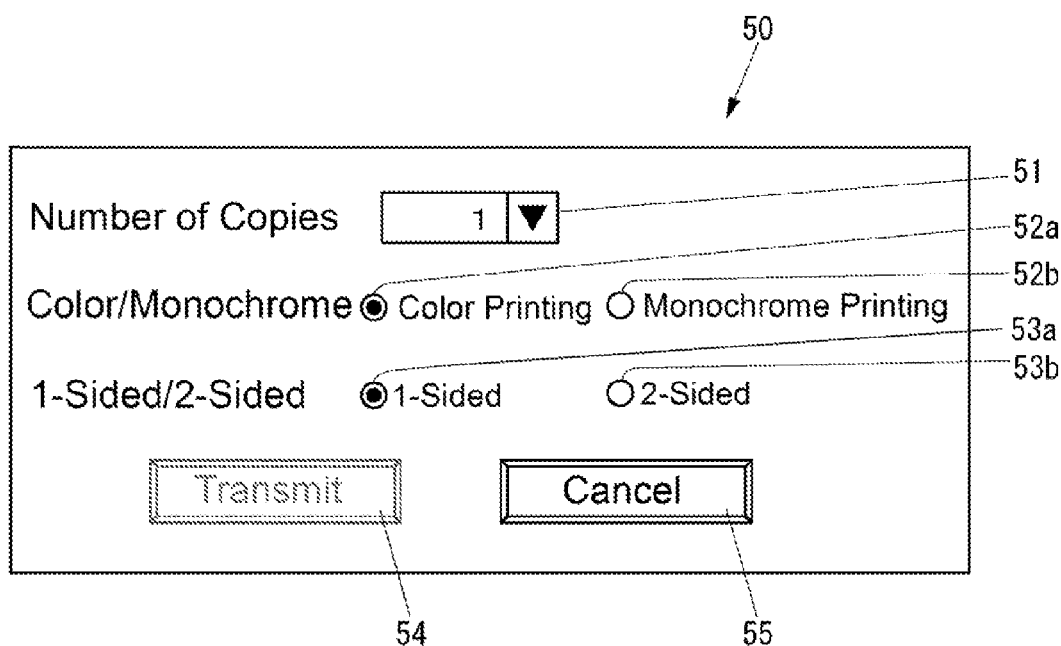
FIG. 8 illustrates an example of the print instruction screen displayed during the operations illustrated in FIG. 5, which is different from the examples illustrated in FIGS. 6 and 7.

The job transmitter 25c controls a user interface (UI) of the print instruction screen 50 in accordance with the user information. For example, when policy information of the user information restricts single-side printing, as illustrated in FIG. 7, the job transmitter 25c causes the radio button 53a to be grayed out while the radio button 53b is selected to refuse the operation. When the job transmitter 25c determines that the number of sheets on which printing has been executed exceeds the permitted number of sheets on the basis of accounting information of the user information, as illustrated in FIG. 8, the job transmitter 25c causes the transmission button 54 to be grayed out to refuse the operation when "the processing item for printing with exceeding the permitted number of sheets," in the accounting information of the user information, is "stop printing." A printing setting is not limited to the above-described setting and may be various kinds of settings. For example, aggregate printing may be configured to be settable as the print setting.

When the job transmitter 25c determines that the specific period has elapsed at Step S104, the job transmitter 25c determines whether the storage unit 24 stores the user information 24b of the logged-in user or not (Step S108).

When the job transmitter 25c determines that the storage unit 24 does not store the user information 24b of the logged-in user at Step S108, the job transmitter 25c terminates the operations illustrated in FIG. 5.

When the job transmitter 25c determines that the storage unit 24 stores the user information 24b of the logged-in user at Step S108, the job transmitter 25c determines whether the validity term 24i of the user information 24b of the logged-in user has expired or not (Step S109).

When the job transmitter 25c determines that the validity term 24i of the user information 24b of the logged-in user has expired at Step S109, the job transmitter 25c deletes the user information 24b of the logged-in user (Step S110) to terminate the operations illustrated in FIG. 5.

When the job transmitter 25c determines that the validity term 24i of the user information 24b of the logged-in user has not expired at Step S109, the job transmitter 25c displays the print instruction screen 50 (see FIG. 6) corresponding to the user information 24b of the logged-in user (Step S111). That is, the job transmitter 25c controls the UI of the print instruction screen 50 in accordance with the user information 24b.

After the process of Step S107 or Step S111, the job transmitter 25c determines whether the transmission button 54 has been touched or not (Step S112).

When the job transmitter 25c determines that the transmission button 54 has not been touched at Step S112, the job transmitter 25c determines whether the cancel button 55 has been touched or not (Step S113).

When the job transmitter 25c determines that the cancel button 55 has been touched at Step S113, the job transmitter 25c terminates the operations illustrated in FIG. 5.

When the job transmitter 25c determines that the cancel button 55 has not been touched at Step S113, the job transmitter 25c executes the process of Step S112.

When the job transmitter 25c determines that the transmission button 54 has been touched at Step S112, the job transmitter 25c generates a print job corresponding to settings on the print instruction screen 50 (Step S114), then transmits the print job generated at Step S114 to a transmission destination (Step S115), and terminates the operations illustrated in FIG. 5. The transmission destination may be specified on the print instruction screen 50, or may be set before the operations illustrated in FIG. 5.

When the server 30 is specified as the transmission destination, the job transmitter 25c transmits the print job as an instruction execution type print job. Here, the job transmitter 25c writes information for user authentication of the user information using printer job language (PJL) in a header of data of the instruction execution type print job. When the process of Step S107 is executed, this user information means the user authentication information of the user information received at Step S105. When the process of Step S111 is executed, this user information means the user authentication information 24c in the user information 24b of the logged-in user. Thus, after confirming that the access is not unauthorized on the basis of the access token transmitted from the user terminal 20, the control unit 35 of the server 30 associates the instruction execution type print job transmitted from the user terminal 20 as the instruction execution type print job 34e with the user identification information transmitted from the user terminal 20 to store (spool) it in the storage unit 34. When the control unit 35 of the server 30 cannot confirm that the access is not unauthorized on the basis of the access token transmitted from the user terminal 20, the control unit 35 does not spool and discards the instruction execution type print job transmitted from the user terminal 20.

When a port number for an instruction execution type print job in the MFP 40 as the transmission destination is designated, the job transmitter 25c transmits the print job as the instruction execution type print job. Here, the job transmitter 25c writes the information for user authentication of the user information using PJL in the header of the data of the instruction execution type print job. When the process of Step S107 is executed, this user information means the user authentication information of the user information received at Step S105. When the process of Step S111 is executed, this user information means the user authentication information 24c of the user information 24b of the logged-in user. Thus, after confirming that the access is not unauthorized on the basis of the access token transmitted from the user terminal 20, the control unit 48 of the MFP 40 associates the instruction execution type print job transmitted from the user terminal 20 as the instruction execution type print job 47e with the user identification information transmitted from the user terminal 20 to store (spool) it in the storage unit 47. When the control unit 48 of the MFP 40 cannot confirm that the access is not unauthorized on the basis of the access token transmitted from the user terminal 20, the control unit 48 does not spool and discards the instruction execution type print job transmitted from the user terminal 20.

When a port number for an ordinary print job in the MFP 40 as the transmission destination is designated, the job transmitter 25c transmits a print job as an ordinary print job.

Figure 9:
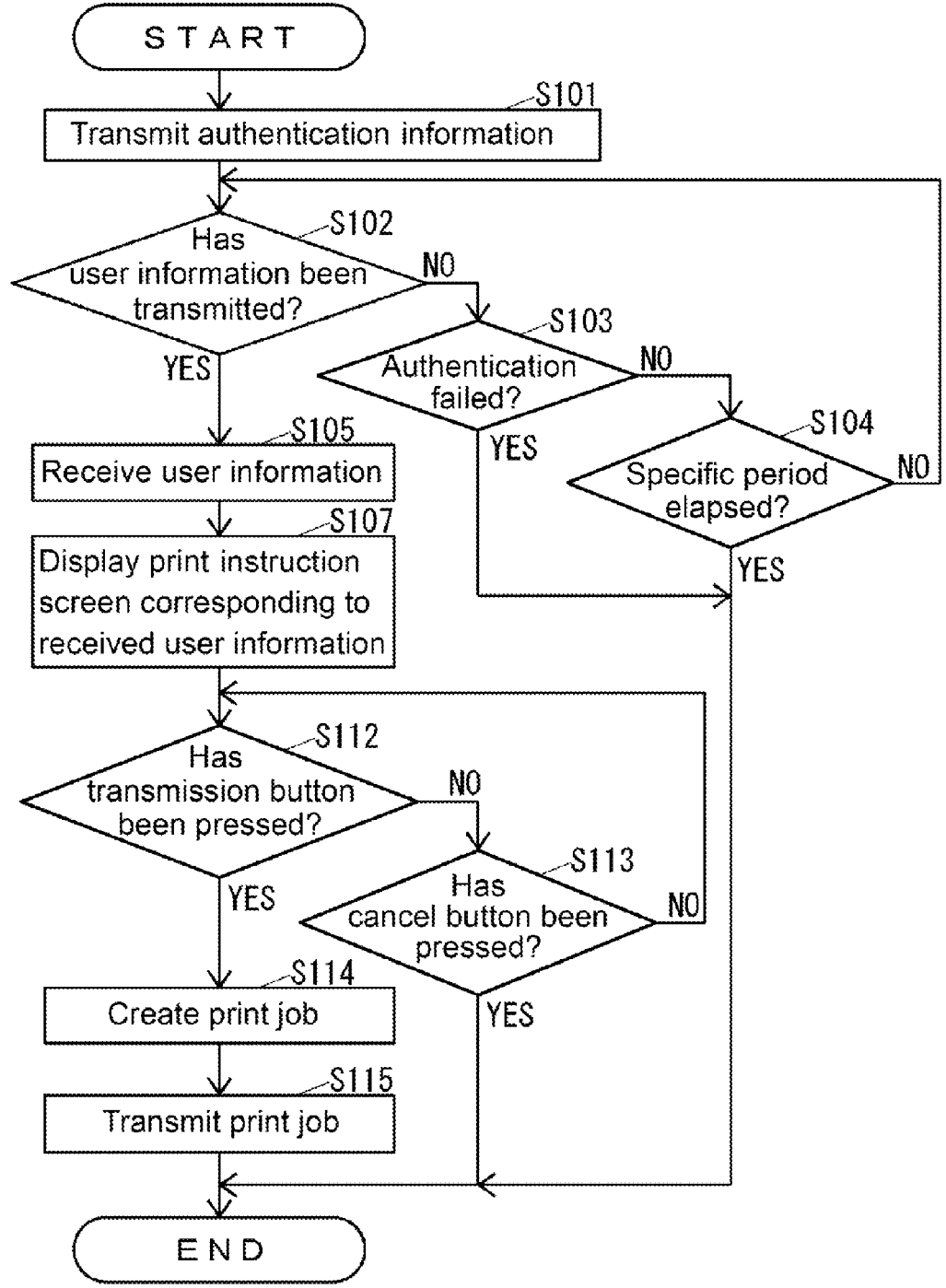
FIG. 9 illustrates operations of the user terminal according to the one embodiment when transmitting a print job, which are different from the operations illustrated in FIG. 5.

The control unit 25 of the user terminal 20 may be configured to include also a setting whether the user information 24b stored in the storage unit 24 is used or not. When being set so as not to use the user information 24b stored in the storage unit 24, the control unit 25 deletes the user information 24b stored in the storage unit 24 to execute operations illustrated in FIG. 9 instead of the operations illustrated in FIG. 5. The operations illustrated in FIG. 9 are operations that the processes of Steps S106 and S108 to Step S111 are omitted from the operations illustrated in FIG. 5.

Next, the following describes operations of the MFP 40 when a user logs in to the printing system 10 using the MFP 40.

Figure 10:
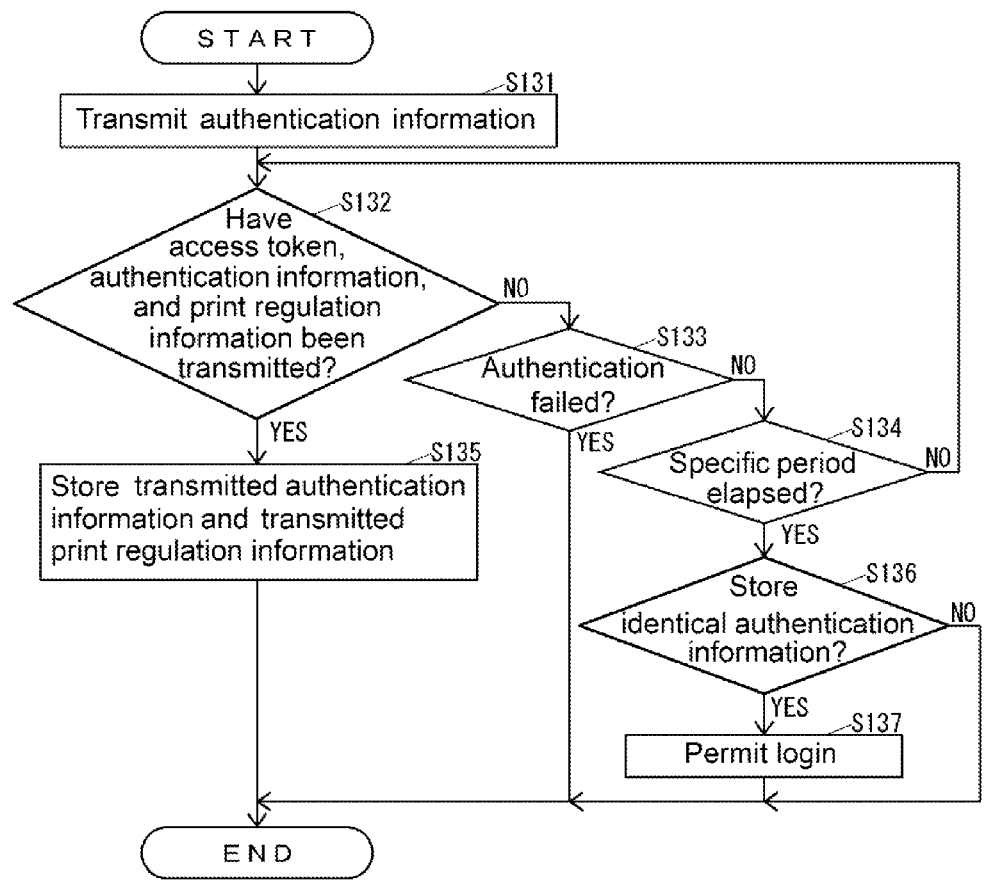
FIG. 10 illustrates operations of the MFP according to the one embodiment when a user logs in to the printing system using the MFP.

FIG. 10 illustrates the operations of the MFP 40 when the user logs in to the printing system 10 using the MFP 40.

The user inputs authentication information via, for example, the operation unit 41 of the MFP 40 to log in to the printing system 10. When the authentication information via the operation unit 41 is received, the control unit 48 of the MFP 40 executes the operations illustrated in FIG. 10.

As illustrated in FIG. 10, the control unit 48 transmits the authentication information received via the operation unit 41 to the server 30 (Step S131). Here, the authentication information may be input via the operation unit 41 before the operations illustrated in FIG. 10 or may be input at Step S131. Thus, when the storage unit 34 stores the authentication information 34a identical to the authentication information transmitted from the MFP 40, the control unit 35 of the server 30 permits a login of a user and returns an access token of this user, the authentication information 34a, and the print regulation information 34b to the MFP 40.

After the process of Step S131, the control unit 48 determines whether the server 30 has transmitted the access token, the authentication information, and the print regulation information or not (Step S132).

When the control unit 48 determines that the access token at Step S132, the authentication information, and the print regulation information have not been transmitted from the server 30, the control unit 48 determines whether a failure of authentication has been notified from the server 30 or not (Step S133).

When the control unit 48 determines that the failure of authentication has been notified from the server 30 at Step S133, the control unit 48 terminates the operations illustrated in FIG. 10.

When the control unit 48 determines that the failure of authentication has not been notified from the server 30 at Step S133, the control unit 48 determines whether a specific period has elapsed after the process of Step S131 or not (Step S134). When the server 30 is in an off-line state, for example, the server 30 is down, or when some sort of communication failure occurs between the server 30 and the MFP 40, the specific period elapses after the process of Step S101.

When the control unit 48 determines that the specific period has not elapsed at Step S134, the control unit 48 executes the process of Step S132.

When the control unit 48 determines that the access token at Step S132, the authentication information, and the print regulation information have been transmitted from the server 30, the control unit 48 stores the authentication information and the print regulation information, which are transmitted from the server 30, respectively as the authentication information 47a and the print regulation information 47b of the logged-in user in the storage unit 47 (Step S135) and terminates the operations illustrated in FIG. 10.

When the control unit 48 determines that the specific period has elapsed at Step S134, the control unit 48 determines whether the storage unit 34 stores the authentication information 47a identical to the authentication information transmitted at Step S131 or not (Step S136).

At Step S136, when the control unit 48 determines that the storage unit 34 does not store the authentication information 47a identical to the authentication information transmitted at Step S131, the control unit 48 terminates the operations illustrated in FIG. 10.

At Step S136, when the control unit 48 determines that the storage unit 34 stores the authentication information 47a identical to the authentication information transmitted at Step S131, the control unit 48 permits the login of the user (Step S137) and terminates the operations illustrated in FIG. 10.

Next, the following describes operations of the MFP 40 when executing the instruction execution type print job spooled in the server 30 or the MFP 40.

Figure 11:
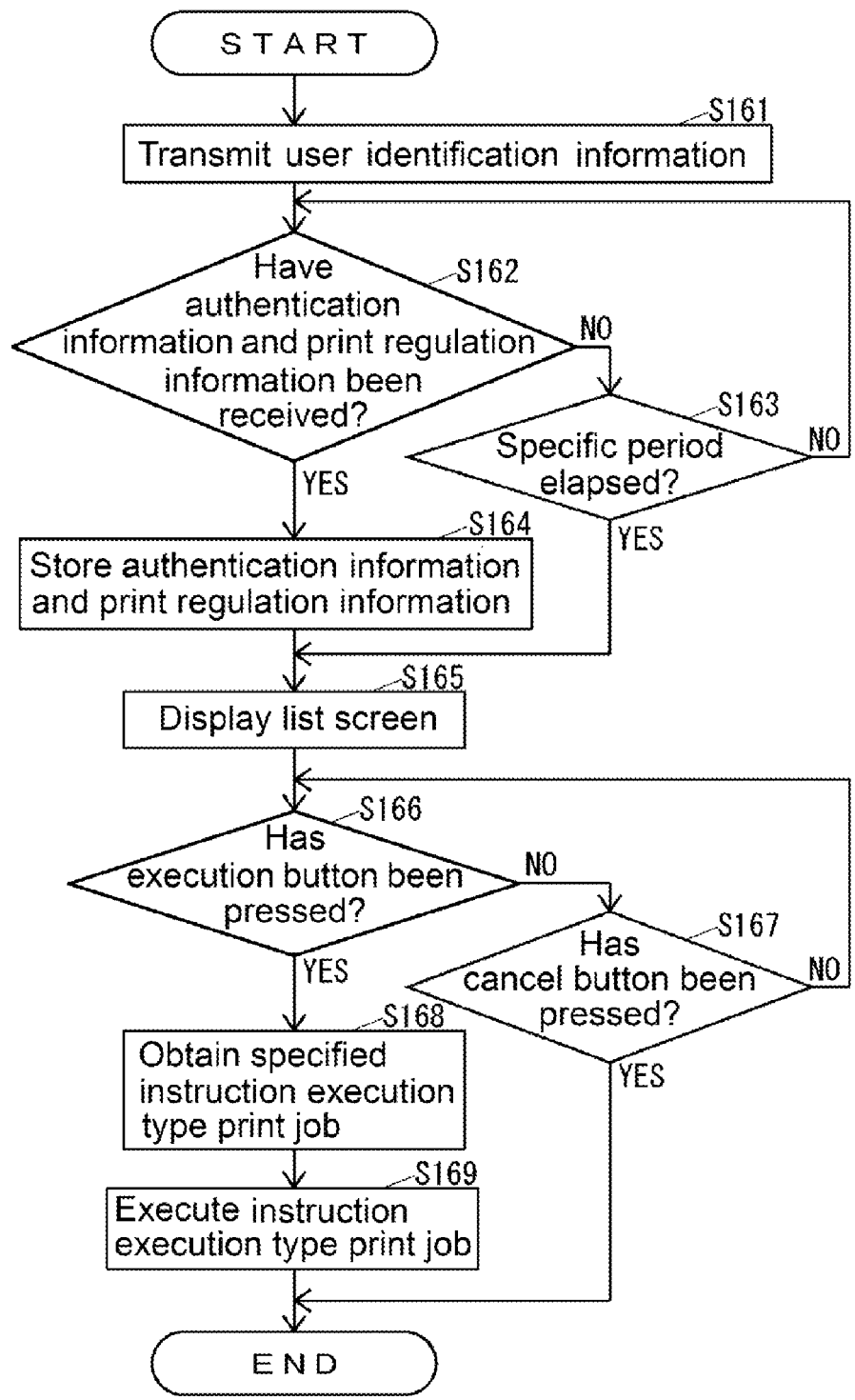
FIG. 11 illustrates operations of the MFP according to the one embodiment when executing an instruction execution type print job spooled in the server or the MFP.

FIG. 11 illustrates the operations of the MFP 40 when executing the instruction execution type print job spooled in the server 30 or the MFP 40.

The user instructs a start of an operation of an execution of the instruction execution type print job via, for example, the operation unit 41 of the MFP 40. When the start of the operation of the execution of the instruction execution type print job is instructed, the control unit 48 of the MFP 40 executes the operations illustrated in FIG. 11.

As illustrated in FIG. 11, the control unit 48 transmits the user identification information of the logged-in user to the server 30 (Step S161). Thus, the control unit 35 of the server 30 returns the authentication information 34a and the print regulation information 34b of the logged-in user, and a list of the instruction execution type print jobs 34e of the logged-in user among the instruction execution type print jobs 34e spooled by the server 30, to the MFP 40.

Next, the control unit 48 determines whether the authentication information and the print regulation information have been received from the server 30 or not (Step S162).

When the control unit 48 determines that the authentication information and the print regulation information have not been received at Step S162, the control unit 48 determines whether a specific period has elapsed after the process of Step S161 or not (Step S163). When the server 30 is in an off-line state, for example, the server 30 is down, or when some sort of communication failure occurs between the server 30 and the MFP 40, the specific period elapses after the process of Step S101.

When the control unit 48 determines that the specific period has not elapsed at Step S163, the control unit 48 executes the process of Step S162.

When the control unit 48 determines that the authentication information and the print regulation information have been received at Step S162, the control unit 48 stores the authentication information and the print regulation information, which are received from the server 30, as the authentication information 47a and the print regulation information 47b of the logged-in user in the storage unit 47 (Step S164). Then, the control unit 48 causes the display 42 to display a list screen 60 (see FIG. 12) into which a list of the instruction execution type print jobs 47e of the logged-in user among the instruction execution type print jobs 47e spooled in the storage unit 47, and a list received along with the authentication information and the print regulation information from the server 30 are combined (Step S165).

When the control unit 48 determines that the specific period has elapsed at Step S163, the control unit 48 causes the display 42 to display the list screen 60 (see FIG. 12) displaying the list of the instruction execution type print jobs 47e of the logged-in user (Step S165).

Figure 12:
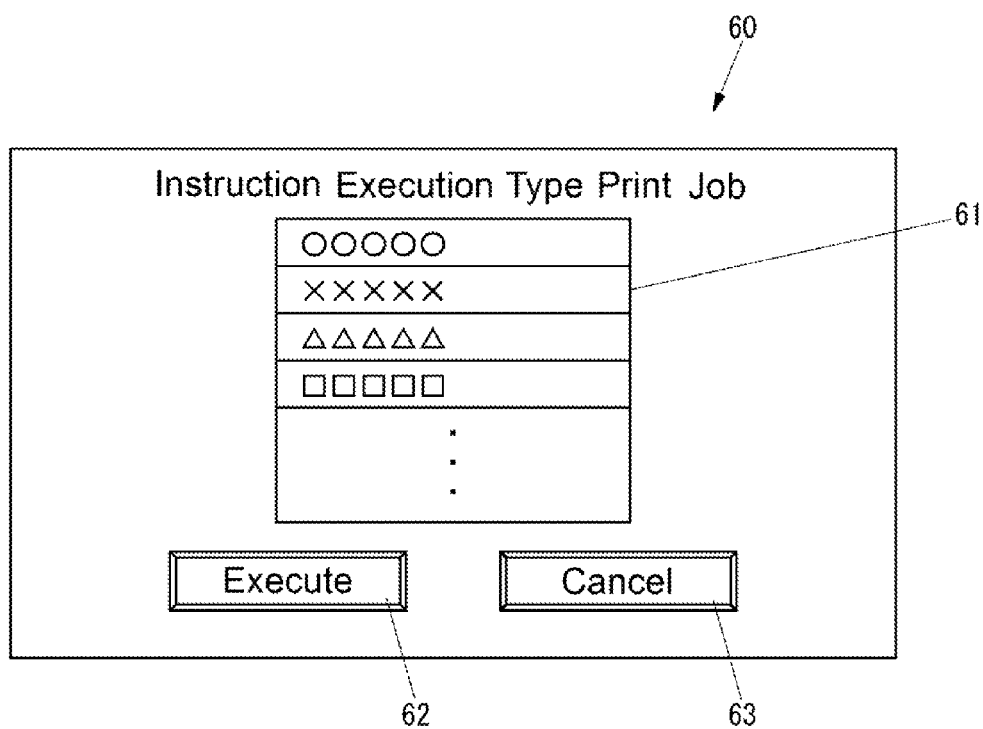
FIG. 12 illustrates an exemplary list screen displayed during the operations illustrated in FIG. 11.

The list screen 60 illustrated in FIG. 12 includes a list box 61, an execution button 62, and a cancel button 63. The list box 61 displays a list of instruction execution type print jobs of the user who has been permitted to log in. The execution button 62 is a button for executing the instruction execution type print job specified in the list box 61. The cancel button 63 is a button for terminating the operations illustrated in FIG. 11.

The control unit 48 disables the designation of an instruction execution type print job whose execution contravenes the regulation of the print regulation information 47b on the list screen 60.

After the process of Step S165, the control unit 48 determines whether the execution button 62 has been touched or not (Step S166).

When the control unit 48 determines that the execution button 62 has not been touched at Step S166, the control unit 48 determines whether the cancel button 63 has been touched or not (Step S167).

When the control unit 48 determines that the cancel button 63 has been touched at S167, the control unit 48 terminates the operations illustrated in FIG. 11.

When the control unit 48 determines that the cancel button 63 has not been touched at Step S167, the control unit 48 executes the process of Step S166.

When the control unit 48 determines that the execution button 62 has been touched at Step S166, the control unit 48 obtains the instruction execution type print job designated in the list box 61 (Step S168). Here, when the instruction execution type print job designated in the list box 61 is spooled by the server 30, the control unit 48 obtains this instruction execution type print job from the server 30. When the instruction execution type print job designated in the list box 61 is spooled by the MFP 40, the control unit 48 obtains this instruction execution type print job from the storage unit 47.

After the process of Step S168, the control unit 48 causes the printer 43 to execute the instruction execution type print job obtained at Step S168 (Step S169) and terminates the operations illustrated in FIG. 11.

The above has described the execution of the instruction execution type print job. However, the printing system 10 accepts also an execution of an ordinary print job, which is not an instruction execution type print job. That is, when the user terminal 20 transmits an ordinary print job to the MFP 40, the MFP 40 does not spool this print job as the instruction execution type print job 47e in the storage unit 47, and the printer 43 executes it.

As described above, in the printing system 10, the user terminal 20 transmits authentication information of a user to the server 30 (Step S101) to store the user information 24b received from the server 30 (Step S106). If the user information 24b has not been received from the server 30 when transmitting the instruction execution type print job to the MFP 40 (YES at Step S104), the user terminal 20 transmits only an instruction execution type print job, corresponding to the print regulation information 24f included in the stored user information 24b, to the MFP 40 (Step S115). Thus, even when being incommunicable with the server 30, the printing system 10 may cause the MFP 40 to spool the instruction execution type print job in accordance with the print regulation information 24f.

In the printing system 10, even when being incommunicable with the server 30, the user terminal 20 uses the stored user authentication information 24c to be able to cause the MFP 40 to spool the instruction execution type print job.

In the printing system 10, even when being incommunicable with the server 30, excessively old print regulation information 24f is not used (Step S110). This ensures the reduced possibility that the MFP 40 spools an inappropriate instruction execution type print job.

While the print apparatus of the disclosure is an MFP in the embodiment, a print apparatus other than an MFP, such as a printer-only machine, may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A printing system operating based on user information including user-correlated print-governing information for governing at least one of printing kind and printing amount, the printing system comprising:
   a server that authenticates users based on the user information;
   an electronic device that generates electronic-device user print jobs; and
   a print apparatus that executes the print jobs, the print apparatus including storage storing a plurality of instruction-executed print jobs and storing the user print-governing information on a per-user basis, and the print apparatus having control functionality for storing the plurality of instruction-executed print jobs correlated with any given of the user information; wherein
   when the server receives authentication information for authenticating a user and authentication of the user based on the received authentication information has succeeded, the server returns to the electronic device the electronic-device user's user information, among said user information, as that of a user whose authentication has succeeded;
   the print apparatus in response to a specified instruction spools an instruction-executed print job as a print job to be executed;
   the electronic device includes
      a central processing unit (CPU), and
      a storage device storing a printer driver;
   the CPU executes the printer driver to function as
      an authentication unit that transmits to the server the electronic-device user's authentication information and receives from the server the electronic-device user's user information,
      a user information storage unit that stores the electronic-device user's user information received by the authentication unit, the electronic-device user's user information therein including the electronic-device user's print-governing information, and
      a job transmitter that uses the electronic-device user's user information received by the authentication unit to transmit to the print apparatus an instruction-executed print job correlated with the electronic-device user's print-governing information; and
   in cases where the user information, not being returned by the server, is not received by the authentication unit, the job transmitter transmits to the print apparatus the instruction-executed print job correlated with the electronic-device user's print-governing information stored in the user information storage unit.

2. A printing system comprising:
   a server that authenticates users;
   an electronic device that generates print jobs; and
   a print apparatus that executes the print jobs; wherein
   when the server receives authentication information for authenticating a user and authentication of the user based on the received authentication information has succeeded, the server returns user information relating to the user whose authentication has succeeded to the electronic device, the user information including print regulation information for regulating at least one of printing kind and printing amount;
   the print apparatus spools an instruction execution type print job as the print job to be executed in response to a specific instruction;
   the electronic device includes
      a central processing unit (CPU), and
      a storage device storing a printer driver;
   the CPU executes the printer driver to function as
      an authentication unit that transmits to the server the authentication information of a user and receives the user information from the server,
      a user information storage unit that stores the user information received by the authentication unit, and
      a job transmitter that uses the user information received by the authentication unit to transmit the instruction execution type print job to the print apparatus; and
   if the user information is not received by the authentication unit, the job transmitter (i) displays a print instruction screen corresponding to the print regulation information included in the user information stored in the user information storage unit, (ii) generates the instruction execution type print job corresponding to settings on the print instruction screen, and (iii) then transmits the generated instruction execution type print job to the print apparatus.

3. A printing system comprising:
   a server that authenticates users;
   an electronic device that generates print jobs; and
   a print apparatus that executes the print jobs; wherein when the server receives authentication information for authenticating a user and authentication of the user based on the received authentication information has succeeded, the server returns user information relating to the user whose authentication has succeeded to the electronic device, the user information including print regulation information for regulating at least one of printing kind and printing amount;

the print apparatus spools an instruction execution type print job as the print job to be executed in response to a specific instruction;

the electronic device includes
a central processing unit (CPU), and
a storage device storing a printer driver;

the CPU executes the printer driver to function as
an authentication unit that transmits to the server the authentication information of a user and receives the user information from the server,
a user information storage unit that stores the user information received by the authentication unit, and
a job transmitter that uses the user information received by the authentication unit to transmit the instruction execution type print job to the print apparatus;

the user information further includes user authentication information, the user authentication information including identification information of the user and authentication success information indicating that the server has succeeded in an authentication of the user;

if the user information is not received by the authentication unit, the job transmitter transmits the user authentication information included in the user information stored in the user information storage unit along with the instruction execution type print job to the print apparatus; and the print apparatus associates the identification information included in the user authentication information and spools the instruction execution type print job.

4. The printing system according to claim 3, wherein:
when the print apparatus confirms that an access is authorized based on the authentication success information of the user authentication information transmitted from electronic device, the print apparatus spools the instruction execution type print job transmitted from electronic device; and
when the print apparatus does not confirm that the access is authorized based on the authentication success information of the user authentication information transmitted from electronic device, the print apparatus discards the instruction execution type print job transmitted from electronic device.

5. The printing system according to claim 3, wherein the job transmitter writes the user authentication information using printer job language in a header of data of the instruction execution type print job.

6. A printing system comprising:
a server that authenticates users;
an electronic device that generates print jobs; and
a print apparatus that executes the print jobs; wherein
when the server receives authentication information for authenticating a user and authentication of the user based on the received authentication information has succeeded, the server returns user information relating to the user whose authentication has succeeded to the electronic device, the user information including print regulation information for regulating at least one of printing kind and printing amount;

the print apparatus spools an instruction execution type print job as the print job to be executed in response to a specific instruction;

the electronic device includes
a central processing unit (CPU), and
a storage device storing a printer driver;

the CPU executes the printer driver to function as
an authentication unit that transmits to the server the authentication information of a user and receives the user information from the server,
a user information storage unit that stores the user information received by the authentication unit, and
a job transmitter that uses the user information received by the authentication unit to transmit the instruction execution type print job to the print apparatus;

if the user information is not received by the authentication unit, the job transmitter transmits the instruction execution type print job corresponding to the print regulation information included in the user information stored in the user information storage unit to the print apparatus;

the user information further includes a validity term; and if the user information is not received by the authentication unit, the job transmitter does not use the user information where the validity term has expired among the user information stored in the user information storage unit.

7. A printing system comprising:
a server that authenticates users;
an electronic device that generates print jobs; and
a print apparatus that executes the print jobs; wherein
when the server receives authentication information for authenticating a user and authentication of the user based on the received authentication information has succeeded, the server returns user information relating to the user whose authentication has succeeded to the electronic device, the user information including print regulation information for regulating at least one of printing kind and printing amount the print apparatus spools an instruction execution type print job as the print job to be executed in response to a specific instruction;

the electronic device includes
a central processing unit (CPU), and
a storage device storing a printer driver;

the CPU executes the printer driver to function as
an authentication unit that transmits to the server the authentication information of a user and receives the user information from the server,
a user information storage unit that stores the user information received by the authentication unit, and
a job transmitter that uses the user information received by the authentication unit to transmit the instruction execution type print job to the print apparatus;

if the user information is not received by the authentication unit, the job transmitter transmits the instruction execution type print job corresponding to the print regulation information included in the user information stored in the user information storage unit to the print apparatus;

when a port number for an instruction execution type print job in the print apparatus as a transmission destination is designated, the job transmitter transmits the print job as the instruction execution type print job to the print apparatus; and when the port number for an ordinary print job in the print apparatus as the transmission destination is designated, the job transmitter transmits the print job as an ordinary print job to the print apparatus.

8. A non-transitory computer-readable recording medium storing a job transmission program executed by an electronic device that generates print jobs, the job transmission program causing the electronic device to function as:

an authentication unit that transmits authentication information for authenticating a user to a server for authenticating the user, so as to receive user information from the server;

a user information storage unit that stores the user information received by the authentication unit; and a job transmitter that transmits an instruction execution type print job as the print job executed in response to a specific instruction to the print apparatus using the user information received by the authentication unit, the print apparatus executing the print job, the user information including print regulation information for regulating at least one of printing kind and printing amount; wherein when the server receives the authentication information and authentication of the user based on the received authentication information has succeeded, the server returns user information relating to the user whose authentication has succeeded to the electronic device;

the print apparatus spools the instruction execution type print job; and if the user information is not received by the authentication unit, the job transmitter (i) displays a print instruction screen corresponding to the print regulation information included in the user information stored in the user information storage unit, (ii) generates the instruction execution type print job corresponding to settings on the print instruction screen, and (iii) then transmits the generated instruction execution type print job to the print apparatus.

* * * * *